A. R. WEISS.
Gas-Torch.
No. 7,975. Reissued Nov. 27, 1877.
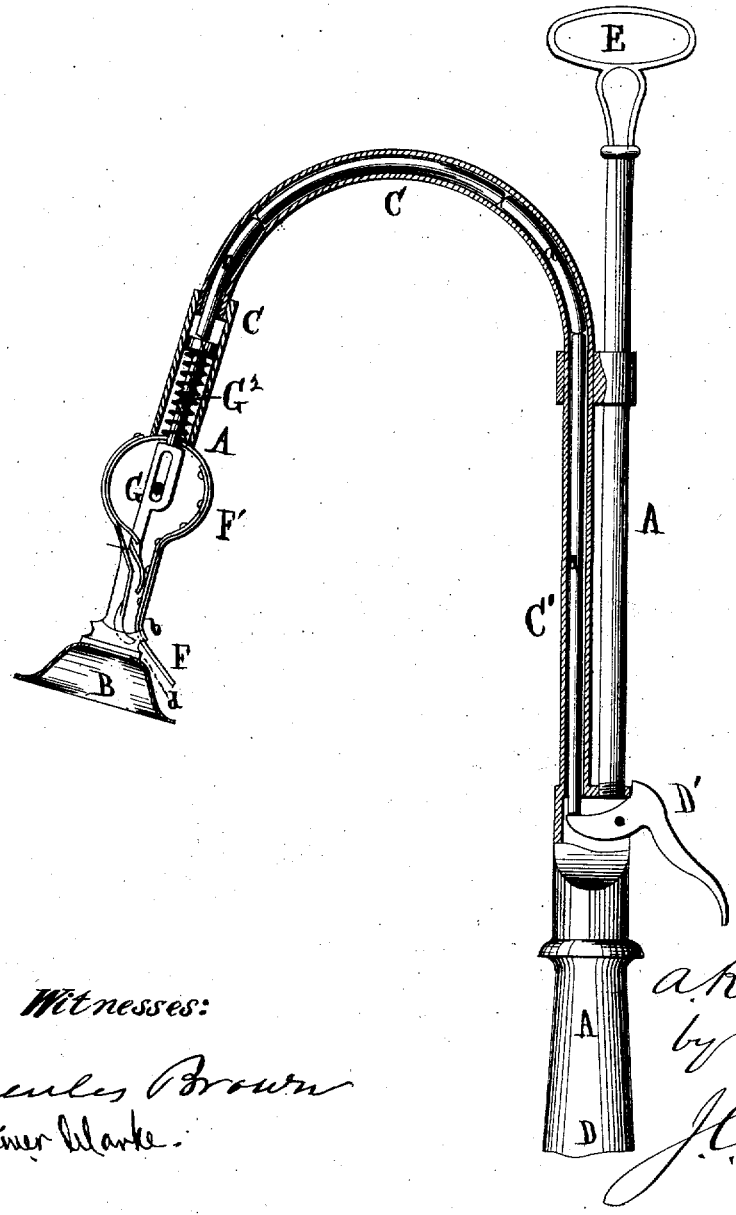
Witnesses:
Charles Brown
Mortimer Clarke.
A. R. Weiss,
by Atty,
J. C. Clayton.
N. PETERS, PHOTO-LITHOGRAPHER, WASHINGTON, D. C.

UNITED STATES PATENT OFFICE.

ALBERT R. WEISS, OF BROOKLYN, NEW YORK.

IMPROVEMENT IN GAS-TORCHES.

Specification forming part of Letters Patent No. 187,072, dated February 6, 1877; Reissue No. 7,975, dated November 27, 1877; application filed October 17, 1877.

*To all whom it may concern:*

Be it known that I, ALBERT R. WEISS, of Brooklyn, in the county of Kings and State of New York, have invented a new and Improved Gas-Torch, of which the following is a specification:

The accompanying drawing represents a vertical longitudinal section of my improved gas-lighting torch.

The object of my invention is to furnish for general use, in private dwellings and public buildings and elsewhere, an improved torch that lights the gas-jet by the ignition of fulminate pellets, fed by a simple and durable mechanism, and ignited by a suitable explosive device.

The invention consists of a lighting-torch for lighting gas-jets, lamps, candles, &c., worked by a fulminate ribbon, whose pellets are fed and ignited by a suitable mechanism operated by a handle, and reset by a spring of the feeding device.

By referring to the drawing, A represents a gas-torch, having the general appearance of the well-known electric gas-torch, with a gas-collecting bell, B, at the end, a bent neck, C, handle D, which may be of any convenient length, and a wrench, E, for turning the gas-cocks. The curved neck C and a straight handle-connecting rod, C′, are made tubular, and serve to guide a piston-rod, *a*, which may be made of different sections—a straight one in the straight part of the guide-tube, and of several curved parts in the neck portion.

The piston-rod *a* may be made of pieces of wire of suitable thickness, or of rubber or other suitable material.

In place of the sectional piston-rod, a continuous flexible wire rod may be employed.

The piston-rod *a* is moved forward by means of a trigger, D′, of the handle, which is worked by the thumb or hand, so as to operate a mechanism for feeding and igniting a fulminate ribbon, F, arranged intermediately between the gas-bell B and the end of the neck C. The fulminate ribbon F is placed, in coiled state, into a magazine, F′, with detachable cover, and fed forward by the sliding feeder G, that is guided by its slotted enlarged part along the center post of the magazine, and extended back through a guide-slot into the straight end of neck C. The feeder G is bent at right angles inside of neck-tube C, so as to form a circular shoulder, on which the piston-rod acts to move the feeder in one direction, while a strong spiral spring, $G^2$, interposed between the end of the closed neck-tube and the shoulder, forces feeder and piston-rod back as soon as the trigger is released.

The forward motion of the pistod-rod and feeder moves the fulminate ribbon forward, and exposes a pellet of the same to the action of the spring-hammer, that is operated by the feeding device.

The ignition of the pellet lights instantly the gas collected by the funnel or bell, when the same has been placed in position above the burner, while the spring of the feeder carries the same and the piston-rod back, and sets the trigger into position for lighting the next burner, and so on.

Any suitable mechanism for igniting the fulminate pellets may be used, as I do not confine myself to the construction shown in the drawing, which illustrates one of many obvious forms of applying my invention.

The fulminate ribbon F is guided to the anvil in suitable manner, and retained thereon by a cross-pin, *b*, for the action of the hammer, the spent ribbon passing off back of the bell through a recess or opening, *d*, to be removed from time to time.

I am aware that it is old to feed a friction continuous match in an extended tube to light chandeliers, and therefore do not claim such a device.

Having thus described my invention, I claim as new and desire to secure by Letters Patent—

1. A gas-torch composed of a suitable mechanism for feeding a fulminate tape, and exploding the same by the blow of a hammer, in combination with a handle and mechanism for operating the torch from the lower end, substantially as and for the purposes set forth.

2. A gas-torch composed of a mechanism for feeding and igniting a fulminate ribbon, operated in connection with a sliding and spring-acted piston-rod from the handle of the torch, substantially in the manner and for the purpose set forth.

3. The combination of the trigger D′, sliding piston-rod *a*, and guide-tube C C′, straight or curved, with a sliding and spring-acted mechanism for feeding and igniting the pellets of a fulminate ribbon at the end of the torch, substantially as shown and described.

4. The sliding and spring-acted feeder, having extension with end shoulder or seat, in combination with a trigger-acted and sliding piston-rod to push the feeder forward for ignition of pellet, and carry feeder and piston back for resetting trigger, substantially as set forth.

5. The magazine F′, having guide-pin near the anvil and exit-opening back of the bell to guide ribbon to anvil and to the outside, substantially as specified.

ALBERT RICHARD WEISS.

Witnesses:
WILLIAM C. TRULL,
J. C. CLAYTON.